United States Patent [19]
Dawson

[11] Patent Number: 5,722,674
[45] Date of Patent: Mar. 3, 1998

[54] ECCENTRIC AXLE HOUSING

[75] Inventor: James Earl Dawson, West Bend, Wis.

[73] Assignee: Trak International, Port Washington, Wis.

[21] Appl. No.: 606,582

[22] Filed: Feb. 26, 1996

[51] Int. Cl.$^6$ ............................ B60G 1/02; B60B 35/00
[52] U.S. Cl. ....................... 280/149.2; 180/209; 180/906
[58] Field of Search ........................... 180/209, 906; 280/149.2, 638, 43; 301/1, 137, 128; 305/153, 154

[56] References Cited

U.S. PATENT DOCUMENTS

| | | | |
|---|---|---|---|
| Re. 34,659 | 7/1994 | Reilly | 280/661 |
| 1,926,244 | 9/1933 | Sargent | 305/153 |
| 2,691,553 | 10/1954 | Pettigrew | 384/447 |
| 3,520,377 | 7/1970 | Wallace | 180/7.1 |
| 3,582,105 | 6/1971 | Reynolds | 280/685 |
| 3,612,200 | 10/1971 | Cailyer | 180/7.1 |
| 3,874,619 | 4/1975 | Collins et al. | 180/7.1 |
| 4,184,698 | 1/1980 | Raidel | 280/686 |
| 4,588,232 | 5/1986 | Kim et al. | 301/1 |
| 4,755,005 | 7/1988 | Tsai | 301/1 |
| 4,813,163 | 3/1989 | Livingston et al. | 384/255 |
| 4,909,641 | 3/1990 | Mc Kenzie | 384/536 |
| 4,968,055 | 11/1990 | Reilly | 280/661 |
| 5,201,378 | 4/1993 | Bamford | 180/906 |

FOREIGN PATENT DOCUMENTS

| | | | |
|---|---|---|---|
| 927422 | 5/1955 | Germany | 280/43 |
| 57-161316 | 10/1982 | Japan | 384/255 |
| 462 944 | 5/1975 | U.S.S.R. | |
| 928 109 | 5/1982 | U.S.S.R. | |

Primary Examiner—Peter C. English
Attorney, Agent, or Firm—Dickstein Shapiro Morin & Oshinsky LLP

[57] ABSTRACT

A skidsteer loader having an eccentric axle housing which permits the use of common components to construct skidsteer loaders with different wheel base lengths. The eccentric axle housing is constructed such that when it is mounted to the frame of a skidsteer loader in one relationship with respect to the frame, the wheel base of the skidsteer loader will be a first length, and when mounted in another relationship with respect to the frame, the skidsteer loader has a wheel base different from the first length.

2 Claims, 2 Drawing Sheets

ECCENTRIC AXLE HOUSING

BACKGROUND OF THE INVENTION

1. Field of the Invention

The present invention relates to skidsteer loaders, and more particularly to axle support structures for skidsteer loaders.

2. Background Prior Art

Skidsteer loaders are used in a variety of applications for lifting, moving, and loading heavy or bulky material. Skidsteer loaders are manufactured in various sizes having different load capacities.

One essential factor determining the operating load capacity of a skidsteer loader is the length of the wheel base. In prior art arrangements different frame configurations are needed to obtain different wheel base lengths in skidsteer loaders. Therefore, the manufacturing of skidsteer loaders with different wheel base lengths has required the use of different sized components, fixtures, and jigs. The need for different sized components, fixtures and jigs increases the cost of manufacturing the skidsteer loaders.

SUMMARY OF THE INVENTION

The invention includes a skidsteer loader having an eccentric axle housing which permits the use of common components to construct skidsteer loaders with different wheel base lengths. The eccentric axle housing is constructed such that when it is mounted to the frame of a skidsteer loader in one relationship with respect to the frame, the wheel base of the skidsteer loader will be a first length, and when mounted in another relationship with respect to the frame, the skidsteer loader has a wheel base different from the first length.

One advantage of this invention is that it reduces the cost of manufacturing skidsteer loaders with different sized wheel bases. This reduction in manufacturing cost is because the use of the invention permits the use of common components in the production of skidsteer loaders with different length wheel bases. Additionally, the cost of manufacture is reduced because common jigs and fixtures can be used in the production of skidsteer loaders that have different wheel base lengths, and components for such skidsteer loaders.

One embodiment of the invention includes a skidsteer loader with a frame including a lifting arm supported by the frame for selective pivotal movement. The skidsteer loader also has a front axle and a rear axle supported by wheels. There is at least one eccentric axle housing connected to the frame, and the eccentric axle housing includes a body and an axle support. The axle support has a center which is spaced from the center of the body. The axle support houses a portion of one of the axles.

In one form the invention includes a skidsteer loader including a frame with a center, a lifting arm supported by the frame for selective pivotal movement, a front axle and a rear axle, the front and rear axles each supported by wheels, and the axles supporting the frame. There is at least one eccentric axle housing connected to the frame, and the eccentric axle housing includes a bore adapted to house a portion of one of the axles. The eccentric axle housing is connectable to the frame selectively and alternatively in a first axle housing position wherein the axle is supported at a forward position with respect to the center of the frame, and a second axle housing position wherein the axle is supported at a second position rearward of the forward position.

In one form the invention is a vehicle including a frame with a center, a front axle and a rear axle, the front and rear axles each supported by wheels, and the axles supporting the frame. There is at least one eccentric axle housing connected to the frame, and the eccentric axle housing includes a bore adapted to house a portion of one of the axles. The eccentric axle housing is connectable to the frame selectively and alternatively in a first axle housing position wherein the axle is supported at a forward position with respect to the center of the frame, and a second axle housing position wherein the axle is supported at a second position rearward of the forward position.

In one form the invention includes an eccentric axle housing for use in a vehicle having a frame including a center, a front axle and a rear axle, the front and rear axles each supported by wheels, and the axles supporting the frame. The eccentric axle housing includes a body having a bore adapted to house a portion of one of the axles. The body is connectable to the frame selectively and alternatively in a first axle housing position wherein the axle is supported at a forward position with respect to the center of the frame and a second axle housing position wherein the axle is supported at a second position rearward of the forward position.

In one form the invention is an eccentric axle housing for use in a skidsteer loader having a frame including a front and a rear, a lifting arm supported by the frame for selective pivotal movement, and a front axle and a rear axle each supported by wheels. The eccentric axle housing includes a body having a center and an axle support. The axle support has a center which is spaced from the center of the body. The axle support houses a portion of one of either the front axle or the rear axle, thereby supporting one of the front axle or the rear axle.

These and other features and advantages of the invention will become apparent upon review of the following detailed description of the preferred embodiment of the invention, claims, and drawings.

Figure 1:
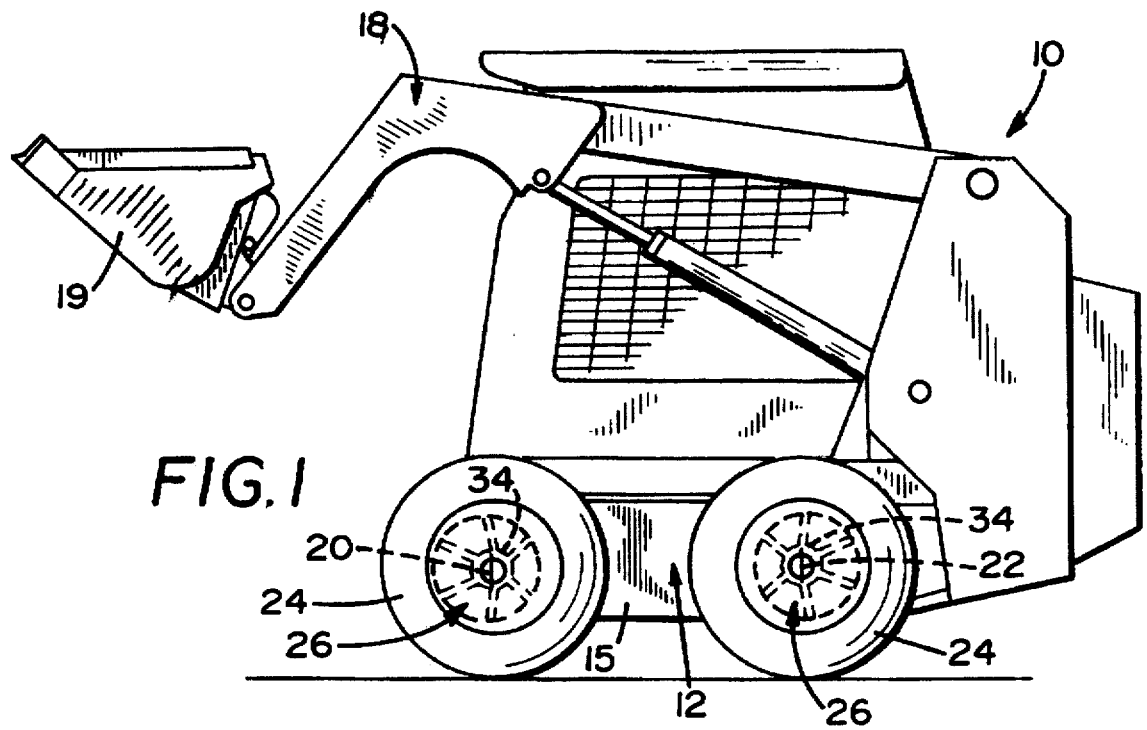
FIG. 1 is a side elevational view of a skidsteer loader embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

FIG. 1 illustrates a load lifting vehicle or skidsteer loader 10 including a frame 12. The skidsteer loader 10 also includes a lifting arm 18 supported by the frame 12 for selective pivotal movement in relation to the frame 12. In the illustrated arrangement the lifting arm 18 supports a bucket 19.

Figure 2:
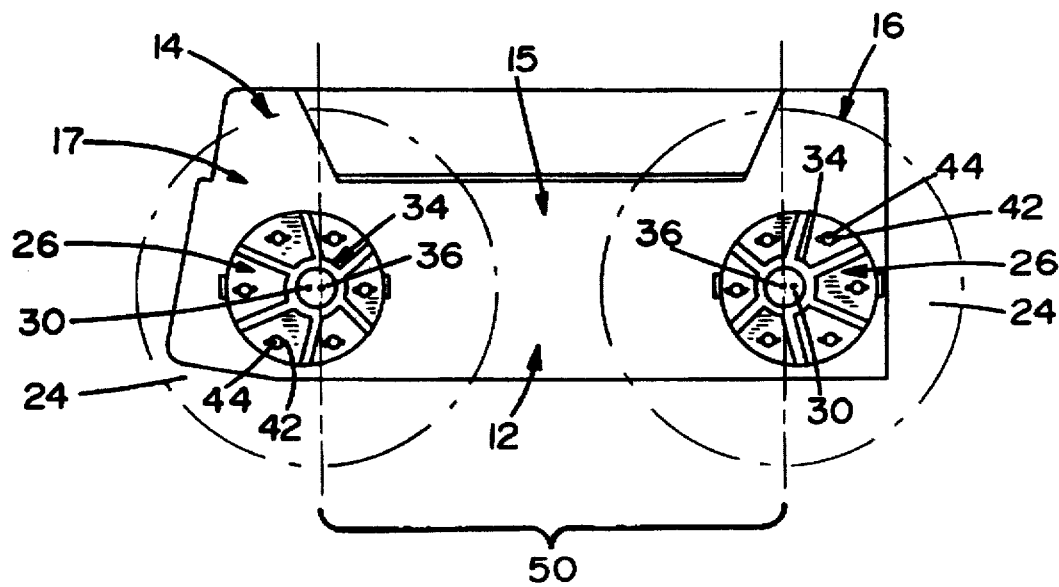
FIG. 2 is an enlarged partial view of the skidsteer loader illustrated in FIG. 1.

As illustrated in FIG. 2, the frame 12 has a front 14, a center 15 and a rear 16. Additionally, the frame 12 has a left side 17 and right side, of which only the left side 17 is illustrated in the figures.

Referring to FIGS. 1 and 2, the skidsteer loader 10 includes a front axle 20 and a rear axle 22, which support the frame 12, and are supported by wheels 24. The front axle 20 and the rear axle 22 are each supported by two eccentric axle housings 26 which are mounted to the frame 12. For support of the front axle 20, two eccentric axle housings 26 are mounted to the front 14 of the frame 12, one on the left side 17 of the frame 12, and one on the right side 17 of the frame. Two other eccentric axle housings 26, which support the rear axle, are mounted on the rear 16 of the frame 12, one on the left side 17 of the frame 12 and the other on the right side of the frame which is not illustrated. The relationship between the eccentric axle housings 26 and the front and rear axles, 20 and 22, will be discussed in more detail after the structure of the eccentric axle housings 26 is discussed.

Figure 3:
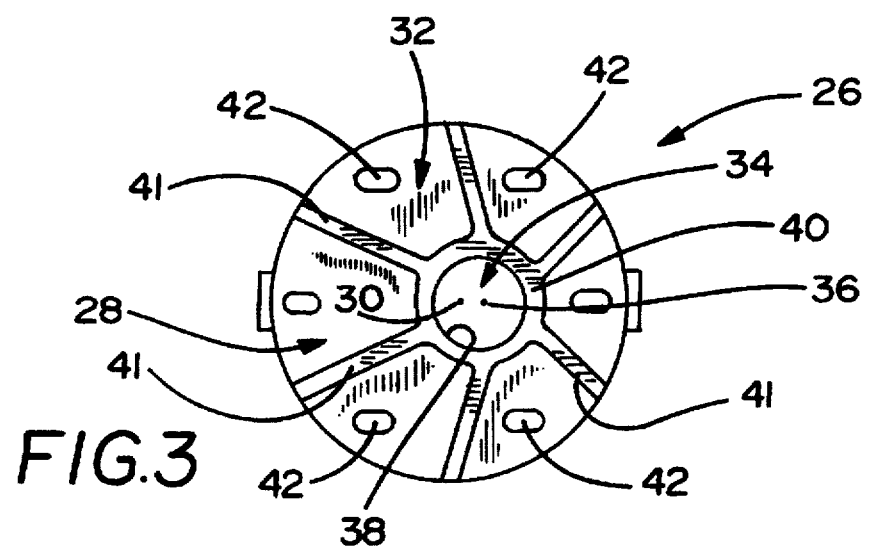
FIG. 3 is an enlarged partial view of an axle housing of the skidsteer loader illustrated in FIG. 2.

FIG. 3 illustrates an eccentric axle housing 26 which includes a body 28 having a center 30 and the body 28 comprising a generally circular disc or plate, 32. The eccentric axle housing 26 further includes an axle support 34 that has a center 36 which is spaced from the center of the body 30. The axle support 34 includes a bore 38 in the body 28, and a cylinder 40 surrounding the bore 38. The cylinder 40 is fixed to and projects from the body 28. Although the cylinder 40 could be fixed to the body 28 in other ways, in the preferred embodiment the cylinder 40 is welded to the body 28.

The eccentric axle housing 26 also includes supports or gussets 41 fixed to the body 28 and extending from the cylinder 40 to the outer edge of the body 28. The gussets 41 provide structural support to the axle support 34. In the illustrated embodiment, there are six gussets 41 fixed to each eccentric axle housing 26. In the illustrated embodiment the gussets 41 are welded to the body 28 and the axle support 34.

Referring again to FIG. 1, the axle supports 34 of the two eccentric axle housings 26 mounted on the front 14 of the frame 12 each house a separate portion of the front axle 20 and support the front axle 20. The axle supports 34 of the two eccentric axle housings 26 mounted on the rear 16 of the frame 12, each house a separate portion of the rear axle 22 and support the rear axle 22. The portions of the front and rear axles, 20 and 22, that are supported by the axle supports 34 are cylindrical in shape and fit within the cylinders 40 of the axle supports 34.

The skidsteer loader 10 also includes means for selectively and alternatively mounting the eccentric axle housings 26 to the frame 12 in alternative positions. While various means for mounting may be employed, the preferred embodiment employs means comprising a number of horizontal slots 42 formed through the body 28 of the eccentric axle housing 26. Fasteners, such as bolts 44, extend through the horizontal slots 42, and are fixed to the frame 12.

Each of the four eccentric axle housings 26, of which only the two mounted on the left side of the frame are illustrated, are selectively and alternatively mountable to the frame 12 in two positions: a first position in which the center 36 of the axle support 34 is forward of the center 30 of the eccentric axle housing 26, and in a second position in which the center 36 of the axle support 34 is rearward of the center 30 of the eccentric axle housing 26. Stated differently, each eccentric axle housing 26 is selectively and alternatively mountable to the frame 12 in a first position in which the axle support 34 is at a forward position with respect to the center 15 of the frame 12, and in a second position in which the axle support 34 is at a second position rearward of the forward position.

Figure 4:
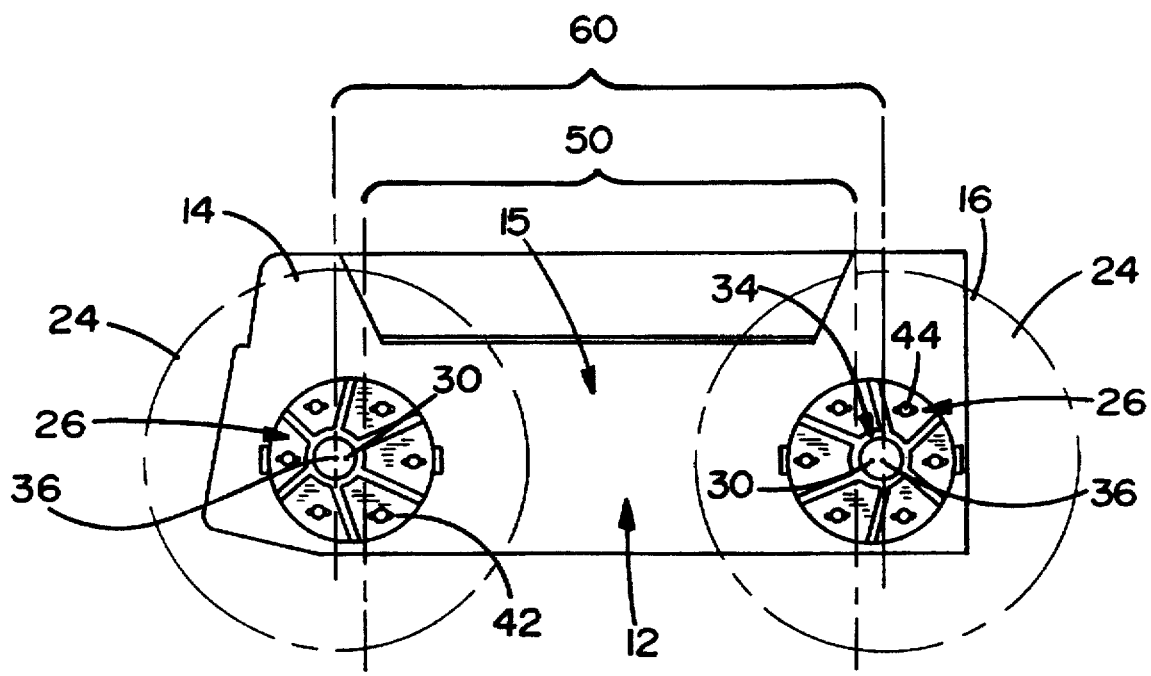
FIG. 4 is a view similar to FIG. 2, but showing the axle housings in an alternative arrangement.

FIGS. 2 and 4 illustrate the eccentric axle housings 26 mounted on the left side 17 of the frame 12 in the different positions. FIGS. 2 and 4 also illustrate the effect that the different positions of the eccentric axle housings 26 have on the wheel base length of the skidsteer loader 10.

In FIG. 2, the eccentric axle housing 26 shown mounted on the rear of the left side 17 of the frame 12 is in the first position wherein the axle support center 36 is forward of the eccentric axle housing center 30, and the axle support 34 is at a forward position with respect to the center of the frame. Although it is not illustrated, the eccentric axle housing 26 mounted to the rear right side of the frame 12 is mounted in a similar position. The eccentric axle housing 26 shown mounted on the front of the left side 17 of the frame 12 is shown in a position wherein the axle support center 36 is rearward of the eccentric axle housing center 30, and the axle support 34 is at a rearward position with respect to the center of the frame 15. Although it is not illustrated, the eccentric axle housing 26 mounted to the front right side of the frame 12 is mounted in a similar position. This configuration, as illustrated in FIG. 2, with the front axles supported in a rearward position, and the rear axles supported in a forward position with respect to the center of the frame, is called an "eccentric in" configuration of the eccentric axle housings. The "eccentric in" configuration results in the skidsteer loader having a shorter wheel base length 50 as compared to other configurations which will be discussed below.

In FIG. 4, the eccentric axle housing shown mounted to the rear 16 left side 17 of the frame 12 is shown in the second position wherein the axle support center 36 is rearward of the eccentric axle housing center 30, and the axle support 34 is at a rearward position with respect to the center 15 of the frame 12. Although it is not illustrated, the eccentric axle housing 26 mounted to the rear right side of the frame 12 is mounted in a similar position. The eccentric axle housing 26 shown mounted to the front 14 left side 17 of the frame 12 is shown in the first position wherein the axle support center 36 is forward of the eccentric axle housing center 30, and the axle support 34 is at a forward position with respect to the center of the frame. Although it is not illustrated, the eccentric axle housing 26 mounted to the front right side of the frame 12 is mounted in a similar position. This configuration of the eccentric axle housings 26, as illustrated in FIG. 4, with the front axles supported in a forward position and the rear axles supported in a rearward position with respect to the center of the frame, is called an "eccentric out" configuration. The "eccentric out" configuration results in the skidsteer loader having a longer wheel base length 60 than the "eccentric in" configuration.

Although not illustrated, other potential configurations are possible by varying the positions of the eccentric axle housings 26 as they are mounted to the frame 12. For example, the eccentric axle housings 26 mounted to the front 14 and rear 16 of the frame 12 may all be mounted to the frame 12 in the first position wherein both the front and rear axles, 20 and 22, are supported in a forward position with respect to the center 15 of the frame 12. Additionally, the eccentric axle housings mounted to the front 14 and rear 16 of the frame 12 may all be mounted to the frame 12 in the second position wherein both the front and rear axles, 20 and 22, are supported in a rearward position with respect to the center 15 of the frame 12. By mounting the eccentric axle housings 26 to the frame 12 in the different configurations as illustrated or explained, the wheel base length of the skidsteer loader may be varied while using common components, jigs and fixtures.

One of the advantages of this invention is that it reduces the cost of manufacturing skidsteer loaders with different sized wheel bases. This reduction in manufacturing cost is because the use of the invention permits the use of common components in the production of skidsteer loaders with different length wheel bases. The cost of manufacture is also reduced because common jigs and fixtures can be used in the production of skidsteer loaders that have different wheel base lengths. Additionally, common jigs and fixtures can be used in the production of the components for the skidsteer loaders.

Various features of the invention are set forth in the following claims.

I claim:

1. A skidsteer loader comprising:

a frame including a front and a rear;

a lifting arm supported by said frame for selective pivotal movement;

a front axle and a rear axle, said front and rear axle each supported by wheels; and at least one eccentric axle housing connected to said frame;

said eccentric axle housing including a body having a center and an axle support, said axle support having a center which is spaced from said center of said body, said axle support housing a portion of one of said front axle and rear axle thereby supporting one of said front axle and said rear axle;

said eccentric axle housing including means for mounting said eccentric axle housing to the frame alternatively and selectively in a first position wherein the center of the axle support is rearward of the center of the body of the eccentric axle housing, and a second position wherein the center of the axle support is forward of the center of the body of the eccentric axle housing; wherein said means for mounting includes said body having a plurality of horizontal slots formed therethrough, and fasteners extending through said slots which are fixable to said frame.

2. An eccentric axle housing for use in a skidsteer loader having a frame including a front and a rear, a lifting arm supported by said frame for selective pivotal movement, a front axle and a rear axle, said front and rear axles each supported by wheels, the eccentric axle housing comprising:

a body having a center, and an axle support, said axle support having a center which is spaced from said center of said body;

said eccentric axle housing including means for mounting said eccentric axle housing to the frame alternatively and selectively in a first position wherein the center of the axle support is rearward of the center of the body of the eccentric axle housing, and a second position wherein the center of the axle support is forward of the center of the body of the eccentric axle housing, wherein said means for mounting includes said body having a plurality of horizontal slots formed therethrough, and fasteners extending through said slots which are fixable to said frame.

* * * * *